Jan. 26, 1960 T. W. TECHLER 2,922,433
CONTROLS FOR BRINE SUPPLY SYSTEMS
Filed March 10, 1958

INVENTOR
THOMAS W. TECHLER
BY John E. Stryker
ATTORNEY

United States Patent Office 2,922,433
Patented Jan. 26, 1960

2,922,433

CONTROLS FOR BRINE SUPPLY SYSTEMS

Thomas W. Techler, North St. Paul, Minn., assignor, by mesne assignments, to Union Tank Car Company, Chicago, Ill., a corporation of New Jersey Application March 10, 1958, Serial No. 720,224

9 Claims. (Cl. 137—391)

This invention relates to controls for brine supply systems for water softeners, including improved valve means for a system having a brine tank, a conduit for alternately withdrawing brine from the tank and then replacing brine with a fresh supply of liquid, usually water, in a predetermined accurately measured quantity.

It is an object of my invention to provide novel and reliable valve means which combine the advantageous features of float actuated valves and a fluid pressure activated valve responsive to variations in the fluid pressure in a conduit connected to the brine supply system for controlling alternate withdrawal of brine from the tank and replacement of brine with a fresh supply of liquid.

A further object is to provide in a control of the class described a measuring container for replacement liquid disposed to receive liquid from and discharge it through a valve casing containing a first valve having fluid pressure responsive actuating means and a second valve having float actuating means whereby a charge of replacement liquid is discharged into the brine tank when a predetermined volume of liquid has been received in the measuring container.

A further and particular object is to provide for a brine tank adapted to contain a large quantity of solid salt, means for withdrawing concentrated brine from the lower portion of the tank in combination with means for delivering accurately measured quantities of replacement liquid to the upper surface of the body of solid salt in the tank so that the replacement liquid is caused to filter down through the solid salt before being withdrawn as concentrated brine.

The invention also includes certain other novel features of construction which will be pointed out in the following specification and claims.

Referring to the accompanying drawing which illustrates, by way of example and not for the purpose of limitation, a preferred embodiment of my invention:

Fig. 4 is a fragmentary sectional view showing a portion of the valve casing, somewhat enlarged, and details of the inlet passage and check ball contained therein.

Figure 1:
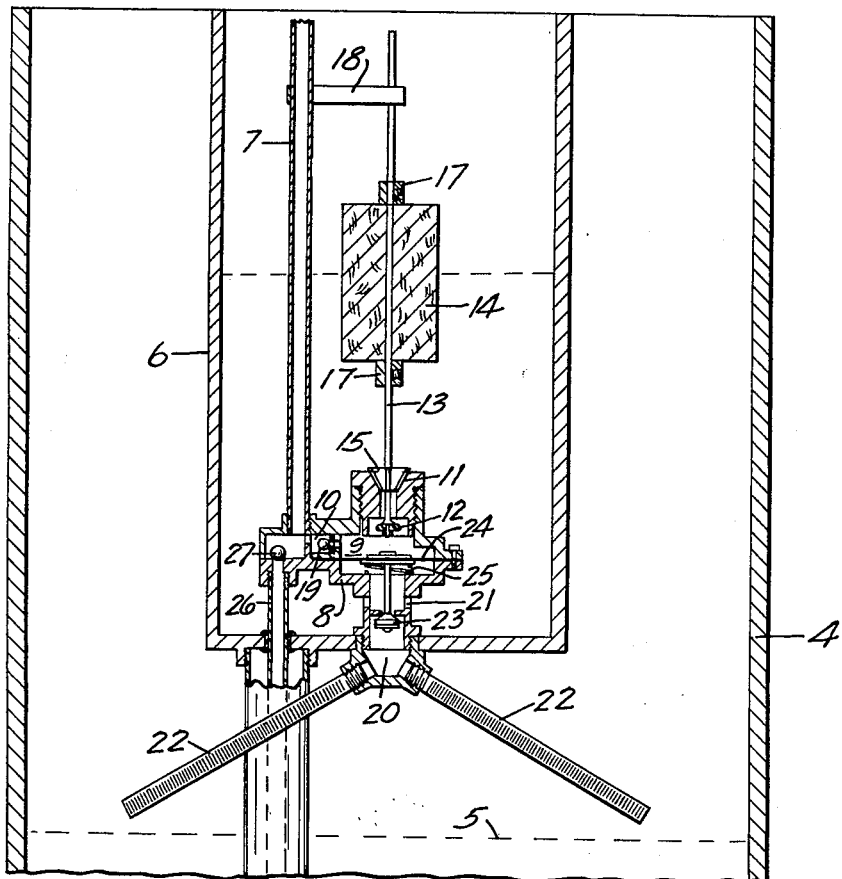
Figure 1 is a central vertical sectional view taken through the brine tank, measuring container and portions of the valve control means, other portions being shown in elevation.
Figure 1:
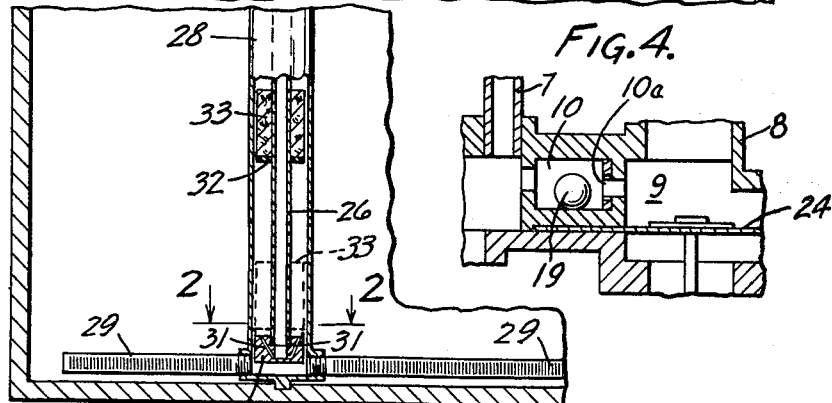
Figure 2:
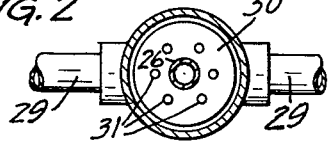
Fig. 2 is a fragmentary horizontal sectional view taken on the line 2—2 of Fig. 1.

As shown in Fig. 1, my brine supply system has a relatively large brine tank 4 adapted to store a large quantity of solid salt or other solid regenerating material. The solid material may extend to an elevation indicated at 5 below the main flow control valve means and measuring container, hereinafter described. Liquid for forming brine is supplied to the upper surface of the body of solid material in the tank 4 from a measuring container 6.

This container is supported in the upper portion of the tank 4 and, like the tank, is of the open type which may be provided with a cover (not shown) vented to atmosphere in suitable manner. A conduit 7 is provided for alternately supplying liquid to the container 6 and withdrawing brine from the lower portion of the tank 4.

Figure 3:
Fig. 3 shows the first or upper valve stem in section and a bottom view of the lower centering means for the stem.

Mounted within the lower portion of the container 6 is valve mechanism having a casing indicated generally at 8 and forming a chamber 9 connected by an inlet passage 10 to the conduit 7. Extending upwardly from the chamber 9 in the casing 8 is a first outlet passage 11 for flow of liquid from chamber 8 into the container 6. Flow through passage 11 is under control of a first valve member 12. This valve member has a seat surrounding the lower end of the passage 11 and is connected by a stem 13 to a float 14. Stem 13 is disposed in coaxial relation to the passage 11 and is confined to substantially vertical movement by the upper and lower guides. The lower guide, indicated at 15, is fixed on the stem 13 and, as shown in detail in Fig. 3, has a plurality of radially projecting fins 16 formed with downwardly converging outer edge surfaces adapted to slidably engage a conical upper end portion of the passage 11 so that this passage is continuously open at its upper end.

Valve stem 13 extends vertically through an axial bearing in the float 14 and the latter is adjustably fastened to the stem by suitable collars 17 each carrying a set screw for engagement with the stem. Above the float 14, the stem 13 projects through and is slidably guided in a bearing opening in an upper guide bracket 18.

Flow through inlet passage 10 is under control of a check ball 19 which only partially closes the passage when flow is from the conduit 7 to the chamber 9 but closes the passage entirely at an axial seat near the left end of passage when sub atmospheric pressure is created in the conduit 7.

As indicated in Fig. 4, the seat for check ball 19 at the right end of passage 10 may be mutilated as by notches 10a to provide for flow to the chamber 9 at a controlled minimum rate during the filling of the tank 4. When flow in this direction stops, check ball 19 drops to a position such as that indicated in Fig. 4, thereby opening passage 10 for maximum rate of flow.

A second outlet passage indicated generally at 20 extends from the lower portion of the container 6 to discharge liquid into the tank 4. This passage has inlet ports 21 communicating with the lower portion of the container 6 and includes branch distributor pipes 22 arranged to spray make-up liquid on the upper surface of the solid regenerating material in the tank 4. Each of the pipes 22 is formed with a multiplicity of outlet openings preferably of elongated slot form, as indicated.

Interposed in the second outlet passage 20 to control flow through it is a second valve member 23 having a stem extending upwardly and connected to a fluid pressure actuated diaphragm 24. The upper side of this diaphragm is subject to fluid pressure in the chamber 9 and the lower side to substantially atmospheric pressure. A spring 25 is confined at the lower side of the diaphragm 24 to bias the latter upwardly and valve member 23 toward closed position on a seat formed in the passage 20.

A vertically disposed second conduit 26 is provided for withdrawing brine from the lower portion of the tank 4. A check ball 27 is disposed to close the upper end of the conduit 26 when fluid at a pressure substantially above atmospheric pressure is being fed to the passage 10 through the conduit 7. A float guide tube 28 is connected at its upper end to the container 6 and is disposed in spaced coaxial relationship to the conduit 26. Intake distributors 29 project substantially horizontally from the lower end portion of the guide tube 28 and are arranged to supply brine to the interior of this tube.

Mounted within the lower end portion of the tube 28 in spaced relation thereto and supported on the lower end of the conduit 26 is an annular head 30. Downwardly converging passages 31 are formed in the head 30 with their lower ends in continuous communication with the conduit 26. The upper ends of passages 31 are open at the upper face of the head 30 and are arranged to be closed by a float actuated valve member 32 fixed on the lower face of a float 33. This float is generally cylindrical in shape and fits loosely in the guide tube 28. Thus the float 33 and member 32 are freely movable vertically along the conduit 26 in response to changes in the level of liquid in the tank 4. The solid regenerating material in the tank 4 is coarse enough so that the tube 28 and intake distributors 29 exclude such material from the float 33, member 32 and conduit 26.

Operation

Ordinarily, line pressure is maintained in the conduit 7 except during regeneration when sub-atmospheric pressure is created in this conduit and in conduit 26 to draw brine from the brine tank 4. This line pressure normally retains valve member 12 in its closed position and fluid pressure in chamber 9 actuates diaphragm 24 to hold valve member 23 in its open position. A charge of brine in the tank 4 now holds float 33 and valve member 32 in raised position, opening outlet passages 31 to the lower end of conduit 26.

To withdraw brine from the tank 4, suitable sub-atmospheric pressure is created in the conduits 7 and 26. The required suction effect may be obtained by the use of an aspirator or other brine draw mechanism of the type commonly provided for water softening apparatus. The resulting reverse flow of liquid and air through passage 10 causes check ball 19 to move to the left and to close this passage after a momentary delay during which sufficient fluid flows past check ball 19 to release pressure in chamber 9 and allow diaphragm 24 to move up and valve member 12 to move down to positions shown in Fig. 1. The inertia of check ball 19 and size of passage 10 is sufficient to cause this delay which allows for the passage of the small amount of fluid necessary to release pressure in chamber 9 and make the diaphragm 24 operative to close valve member 23, while the check ball 27 is drawn away from its seat at the upper end of the conduit 26 and valve member 12 moves to open position by gravity. Brine is now drawn from the lower portion of the tank 4 through the inlet distributors 29, past the periphery of the head 30, down through the passages 31 to the lower end of the conduit 26 and up through this conduit and conduit 7 to the water softening apparatus.

This withdrawal of brine may continue until the float 33 causes valve member 32 to close the upper ends of the passages 31. Sub-atmospheric pressure in the conduit 26 then holds member 32 in securely closed relation to the upper ends of passages 31 thereby preventing the entry of air into the brine draw conduit.

To replenish liquid in the tank 4, liquid is fed under pressure above atmospheric through the conduit 7 and flows at a controlled rate through passage 10 to chamber 9 and thence through passage 11 into container 6. As the elevation of liquid in this container rises and approaches its upper or desired high level the float 14 rises until it causes valve member 12 to close passage 11. This leaves a measured volume of liquid in the container 6. Pressure now builds up in chamber 9 at the upper side of diaphragm 24 until valve member 23 is moved down to its open position. The liquid content of container 6 is thereby caused to flow by gravity through outlet ports 21, passage 20 and distributors 22 and is thereby sprayed on the upper surface of the solid regenerating material in the tank 4. This flow continues until the liquid in container 6 is at the elevation of the lower sides of outlet ports 21. During this discharge of liquid from the container 6, and continuously thereafter until the next brine-draw operation, valve 12 is retained in its closed position by fluid pressure in the chamber 9. As the level of brine in the lower portion of the tank rises, float 33 moves up from its lower position indicated in broken lines in Fig. 1 thereby causing valve member 32 to open passages 31 leading to the lower end of brine draw conduit 26.

Complete cut-off of flow into the container 6 is insured by my arrangement for accurately guiding the valve member 12 to and from its seat. As soon as sufficient pressure builds up above the diaphragm 24 to offset the bias of spring 25, following the closing of the valve member 12, valve member 23 is actuated to open passage 20 and thereby discharge the contents of the measuring container into the brine tank. Thus accurately measured quantities of replacement liquid are assured for each cycle of operation in a system wherein both the brine tank and measuring container are open to atmospheric pressure.

I claim:

1. In a brine supply system having a brine tank, a measuring container for a charge of replacement liquid and a first conduit for alternately supplying liquid to said tank and for withdrawing brine therefrom; valve means for controlling flow to and from said tank and container comprising, a casing defining a chamber, an inlet passage connecting said conduit to said chamber, a first outlet passage for flow from said chamber to said container, a second outlet passage for flow from the lower portion of said container to said tank, a first valve member for controlling flow through said first outlet passage, a float operatively connected to said first valve member to close said first outlet passage when liquid in said container reaches a predetermined high level, a second valve member for closing said second outlet passage, pressure responsive means subject to fluid pressure in said chamber and operatively connected to said second valve member to open said second outlet passage, a second conduit extending from said first conduit to the lower portion of said tank to withdraw liquid therefrom.

2. Valve means in accordance with claim 1 in which a check valve is interposed in said second conduit to cut off flow to the lower portion of said tank when liquid is flowing from said first conduit to said chamber.

3. Valve means in accordance with claim 1 in which a check valve is interposed in said inlet passage to close the same when liquid is flowing under sub-atmospheric pressure from the second conduit to the first conduit.

4. Valve means in accordance with claim 1 in which said second valve member is downwardly opening in relation to an annular seat in said second outlet passage and in which said pressure responsive means comprises a diaphragm operatively connected to said second valve member and spring means biasing said diaphragm and second valve member toward closed position, the upper side of said diaphragm being subject to fluid pressure in said chamber.

5. Valve means in accordance with claim 1 wherein said second outlet passage includes a plurality of branch outlet distributors disposed to spray replacement liquid on the upper surface of solid regenerating material in said tank.

6. In a brine supply system having a brine tank adapted to contain a supply of solid regenerating material, a measuring container for a charge of replacement liquid supported within the upper portion of said tank and a first conduit for alternately supplying liquid to said container and for withdrawing brine from said tank; valve means for controlling flow to and from said tank and container comprising, a casing defining a chamber, an inlet passage connecting said conduit to said chamber, a first outlet passage extending from said chamber to admit liquid to said container, means forming a second outlet passage extending from the lower portion of said container to discharge liquid into said tank at an elevation above the regenerating material therein, a first valve member disposed to control flow through said first outlet passage, a float operatively connected to said first valve member to close said first outlet passage when liquid in said container reaches a predetermined high level, a second valve member normally closing said second outlet passage, fluid pressure responsive means in said chamber operatively connected to said second valve member to open said second outlet passage, a second conduit extending from said first conduit to the lower portion of said tank, and a float operated valve member disposed to cut off flow from said tank into the lower end of said second conduit when the elevation of liquid reaches a predetermined low level in said tank.

7. A brine supply system comprising, a brine tank, a measuring container for a charge of replacement liquid, a first conduit for alternately supplying liquid to said tank and for withdrawing brine therefrom, a valve casing defining a chamber, an inlet passage connecting said conduit to said chamber, a first outlet passage for flow from said chamber to said container, a second outlet passage for flow from the lower portion of said container to said tank, a first valve member for controlling flow through said first outlet passage, a float operatively connected to said first valve member to close said first outlet passage when liquid in said container reaches a predetermined high level, a second valve member for closing said second outlet passage, pressure responsive means subject to fluid pressure in said chamber and operatively connected to said second valve member to open said second outlet passage, a second conduit extending from said first conduit to the lower portion of said tank, and means for cutting off the flow from said tank to the lower end of said second conduit when the liquid reaches a predetermined low level in said tank.

8. Valve means in accordance with claim 6 in which said float operated valve member is contained in a vertically disposed tubular guide excluding the solid regenerating material in said tank from contact with said float operated valve member.

9. Valve means in accordance with claim 8 in which means are provided for admitting brine to the lower end portion of said vertically disposed tubular guide for said float comprising, an apertured intake distributor extending substantially horizontally from the lower end portion of said tubular guide, a passage extending from said distributor to the lower end of said second conduit, said float operated valve member being disposed to close said passage when the liquid reaches a predetermined low level in said tank.

References Cited in the file of this patent

UNITED STATES PATENTS

| | | |
|---|---|---|
| 1,149,675 | Nix et al. | Aug. 10, 1915 |
| 1,956,656 | Rush et al. | May 1, 1934 |
| 2,228,552 | Arbogast | Jan. 14, 1941 |
| 2,240,102 | Textor | Apr. 29, 1941 |
| 2,509,880 | Pelton | May 30, 1950 |
| 2,695,626 | Riche | Nov. 30, 1954 |
| 2,794,342 | Franklin | June 4, 1957 |